US008484697B2

(12) United States Patent
Sato et al.

(10) Patent No.: US 8,484,697 B2
(45) Date of Patent: Jul. 9, 2013

(54) CONTENT DISTRIBUTION SYSTEM, CONTENT DISTRIBUTION METHOD AND PROGRAM

(75) Inventors: Junichi Sato, Tokyo (JP); Akira Kobayashi, Tokyo (JP); Katsuhiro Ochiai, Tokyo (JP); Motonobu Kimura, Tokyo (JP); Kaname Naito, Tokyo (JP); Shuhei Miura, Tokyo (JP)

(73) Assignee: NEC Corporation, Tokyo (JP)

( * ) Notice: Subject to any disclaimer, the term of this patent is extended or adjusted under 35 U.S.C. 154(b) by 804 days.

(21) Appl. No.: 12/523,854

(22) PCT Filed: Dec. 26, 2007

(86) PCT No.: PCT/JP2007/074887
§ 371 (c)(1),
(2), (4) Date: Jul. 20, 2009

(87) PCT Pub. No.: WO2008/090708
PCT Pub. Date: Jul. 31, 2008

(65) Prior Publication Data
US 2010/0100935 A1    Apr. 22, 2010

(30) Foreign Application Priority Data
Jan. 26, 2007    (JP) ................................ 2007-016381

(51) Int. Cl.
*G06F 7/04*      (2006.01)
*G06F 17/30*     (2006.01)
*G06F 15/173*    (2006.01)

(52) U.S. Cl.
USPC .................. 726/2; 726/26; 709/225; 709/226

(58) Field of Classification Search
USPC ............................................. 709/227; 726/3
See application file for complete search history.

(56) References Cited

U.S. PATENT DOCUMENTS

| 7,237,255 B2 * | 6/2007 | Fransdonk ........................ 726/3 |
| 7,299,291 B1 * | 11/2007 | Shaw ............................ 709/231 |
| 7,343,486 B1 * | 3/2008 | McCarty et al. .............. 713/155 |
| 7,701,915 B2 * | 4/2010 | Curcio et al. ................. 370/341 |

FOREIGN PATENT DOCUMENTS

| EP | 1647874 A2 * | 4/2006 |
| JP | 2003123009 A | 4/2003 |
| JP | 2004070463 A | 3/2004 |
| JP | 2004523828 A | 8/2004 |

(Continued)

OTHER PUBLICATIONS

International Search Report for PCT/JP2007/074887 mailed Apr. 8, 2008.

*Primary Examiner* — Saleh Najjar
*Assistant Examiner* — Feliciano Mejia

(57) ABSTRACT

A content distribution system. A distribution management and unauthorized operation management device generates a one-time URL by using URL of content information specified by a user terminal and transmits the one-time URL and bandwidth information concerning the content information to the user terminal. A session control server extracts the one-time URL from a session control message transmitted from the user terminal, transmits it to the distribution management and unauthorized operation management device, and establishes a session between the content distribution server and the user terminal according to an authentication result performed by using the one-time URL transmitted from the distribution management and unauthorized operation management device and a correlation result obtained by correlating the bandwidth information contained in the session control message transmitted from the user terminal with the bandwidth information transmitted together with the authentication result from the distribution management and unauthorized operation management device.

3 Claims, 5 Drawing Sheets

FOREIGN PATENT DOCUMENTS

| | | |
|---|---|---|
| JP | 2004310269 A | 11/2004 |
| JP | 2005252988 A | 9/2005 |
| JP | 2005346389 A | 12/2005 |
| JP | 2006031478 A | 2/2006 |
| JP | 2006155263 A | 6/2006 |
| JP | 2006268141 A | 10/2006 |
| JP | 2007004817 A | 1/2007 |

* cited by examiner

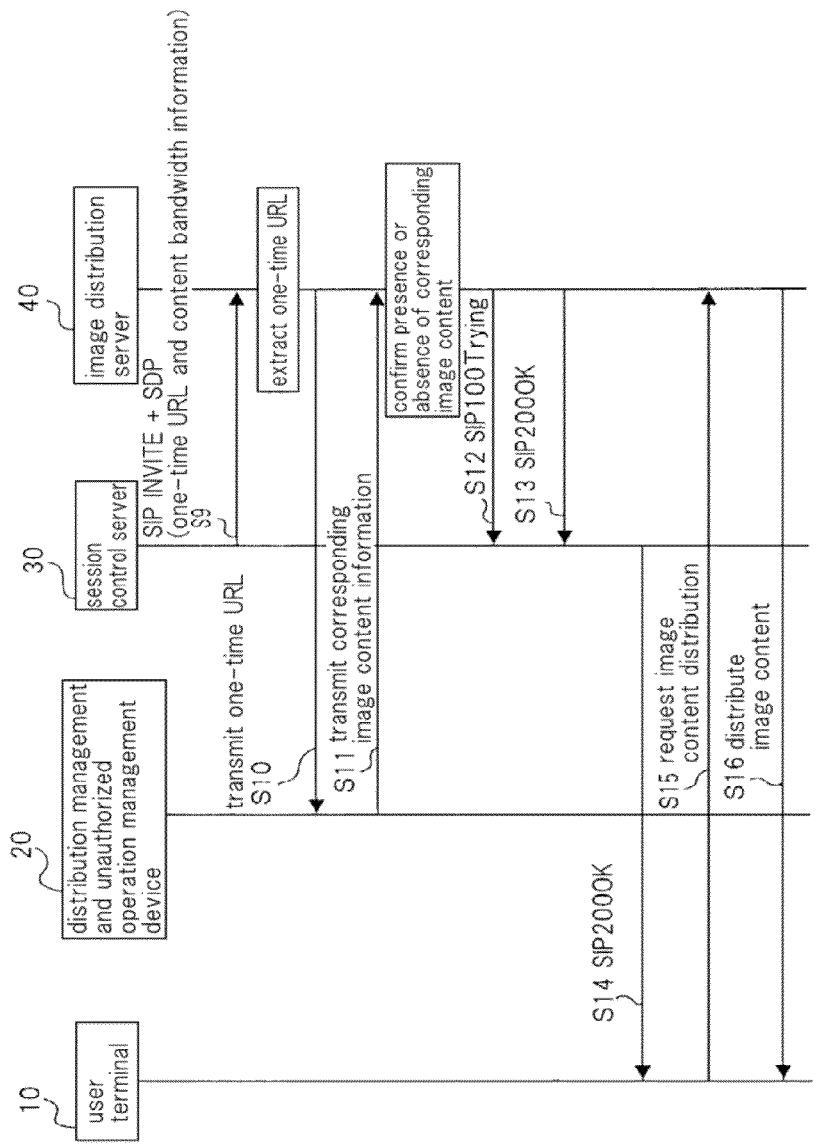

CONTENT DISTRIBUTION SYSTEM, CONTENT DISTRIBUTION METHOD AND PROGRAM

The present application is the National Phase of PCT/JP2007/074887, filed Dec. 26, 2007, which is based upon and claims priority from Japanese Patent Application Number 2007-016381, filed Jan. 26, 2007, the disclosure of which is hereby incorporated by reference herein in its entirety.

TECHNICAL FIELD

The present invention relates to a bandwidth guarantee network, and more particularly, to a content distribution system, a content distribution method and a program for distributing content only to an authenticated user who requested authorized bandwidth guarantee information when requesting the content.

BACKGROUND ART

In a conventional image content distribution system using the Internet, a user terminal generally acquires image content by accessing an image distribution server according to a metafile storing a Uniform Resource Locator (URL) of the image content sent from a distribution management server. At this time, the user terminal performs user authentication using a user ID and a password in order to acquire the metafile from the distribution management server. However, in the case of user authentication using the password, there is a danger that an unauthorized third party may tap the URL of the image content by unfairly acquiring the metafile containing the URL of image content.

An image content distribution system is thus required to prevent copyright infringement of image content, unauthorized watching of paid content, and tapping of personal information such as a user ID and a password or of a URL of image content.

Therefore, technologies for distributing image content to only a specific user using a one-time URL of the image content in order to solve the foregoing problems are disclosed in Japanese Laid-Open Patent Application No. 2004-310269 and Japanese Laid-Open Patent Application No. 2006-268141. In such a system using the one-time URL, when a distribution request for image content is received from a user terminal, a distribution management server describes a metafile containing a one-time URL according to a URL of image content specified by the user terminal and a newly-described password, and transmits the metafile to the user terminal. When the user terminal accesses an image distribution server according to the metafile, the image distribution server requests the distribution management server to confirm a password. In response to the password confirmation request from the image distribution server, the distribution management server confirms by searching whether or not the password exists in a password database of the distribution management server. If the password exists in the password database of the distribution management server, the distribution management server transmits confirmation information to the image distribution server, and at the same time, deletes the password from the password database. When the confirmation information is received from the distribution management server, the image distribution server transmits the image content to the user terminal.

In the case of image content distribution using session control in a bandwidth guaranteed network, when image content is to be watched, bandwidth guarantee by interposing a session control server between the user terminal and the image distribution server is required. Here, when the content of a session control message sent from the user terminal to the session control server is replicated by, for example, an unauthorized program, there is a danger that the user terminal may make an unauthorized bandwidth guarantee request to the session control server. This may case a problem in that network bandwidths are reduced so that the session control server and the image distribution server cannot accept content distribution requests from other users.

In addition, in a body of the session control message used in establishing a session between the user terminal and the image distribution server, media information of image content to be watched and transport information (including an IP address, a port number, etc.) of a transmitting/receiving period are described using a session identifier. Thus, the session control message is required to be encoded according to a tamper-proof technology to prevent the session control message from being altered or revealed. However, even if tamper-proof technology is used, when the content of the session identifier is altered before the session control message is encoded according to the tamper-proof technology in the user terminal, there is a danger of transmitting wrong media or transport information between the user terminal and the image distribution server or of causing an authorized operation such as the unauthorized bandwidth guarantee as described above. In addition, since the user terminal replicates or additionally writes media information or transport information on the body of the session control message when transmitting the session control message, conventional tamper-proof technology can hardly determine whether or not the content is altered. Furthermore, while systems disclosed in Japanese Laid-Open Patent Application Nos. 2004-310269 and 2006-268141 can prevent copyright infringement of image content or unauthorized watching of paid content, they can hardly defend against an unauthorized operation.

DISCLOSURE OF THE INVENTION

The present invention has been made to solve the foregoing problems in the prior art, and an object of the invention is to provide a content distribution system, a content distribution method and a program that can defend against an unauthorized operation, provide high-level security, and distribute content information only to an authenticated user who has requested authorized bandwidth guarantee information.

In order to realize the object, the invention provides a content distribution system for distributing content from a content distribution server to a user terminal by establishing a session by a session control server in a bandwidth guaranteed network. The content distribution system may include a distribution management and unauthorized operation management means generating a one-time URL by using a URL of content information specified by a user terminal and transmits the one-time URL and bandwidth information concerning the content information to the user terminal; and the session control server extracting the one-time URL from a session control message transmitted from the user terminal, transmitting the one-time URL to the distribution management and unauthorized operation management means, and establishing a session between the content distribution server and the user terminal according to an authentication result performed by using the one-time URL transmitted from the distribution management and unauthorized operation management means and a correlation result obtained by correlating the bandwidth information contained in the session control message transmitted from the user terminal to the bandwidth information transmitted together with the authentication result from the distribution management and unauthorized operation management means.

In the invention constructed as above, when the content distribution server distributes the content to the user terminal by establishing the session by the session control server in the bandwidth guaranteed network, firstly, the distribution management and unauthorized operation management means generates a one-time URL using a URL of content information specified by the user terminal, and transmits the generated one-time URL and the bandwidth information concerning the content information to the user terminal. Then, the session control server extracts the one-time URL from a session control message transmitted from the user terminal and transmits the one-time URL to the distribution management and unauthorized operation management means. The distribution management and unauthorized operation management means authenticates the user terminal using the one-time URL transmitted from the session control server and transmits an authentication result obtained by authenticating the user terminal to the session control server. Then, the session control server correlates the bandwidth information contained in the session control message transmitted from the user terminal to the bandwidth information transmitted together with the authentication result from the distribution to management and the unauthorized operation management means. Next, the session control server establishes a session between the content distribution server and the user terminal according to the authentication result transmitted from the distribution management and the unauthorized operation management means and the correlation result of the bandwidth information.

According to the construction as set forth above, the present invention can defend against an unauthorized operation, provide high-level security, and distribute content information only to an authenticated user who requested authorized bandwidth guarantee information.

BRIEF DESCRIPTION OF DRAWINGS

FIG. 6 is a timing chart for explaining the content distribution method in the content distribution system shown in FIGS. 1 to 4.

BEST MODE FOR CARRYING OUT THE INVENTION

Exemplary embodiments of the invention will now be described more fully hereinafter with reference to the accompanying drawings.

Figure 1:
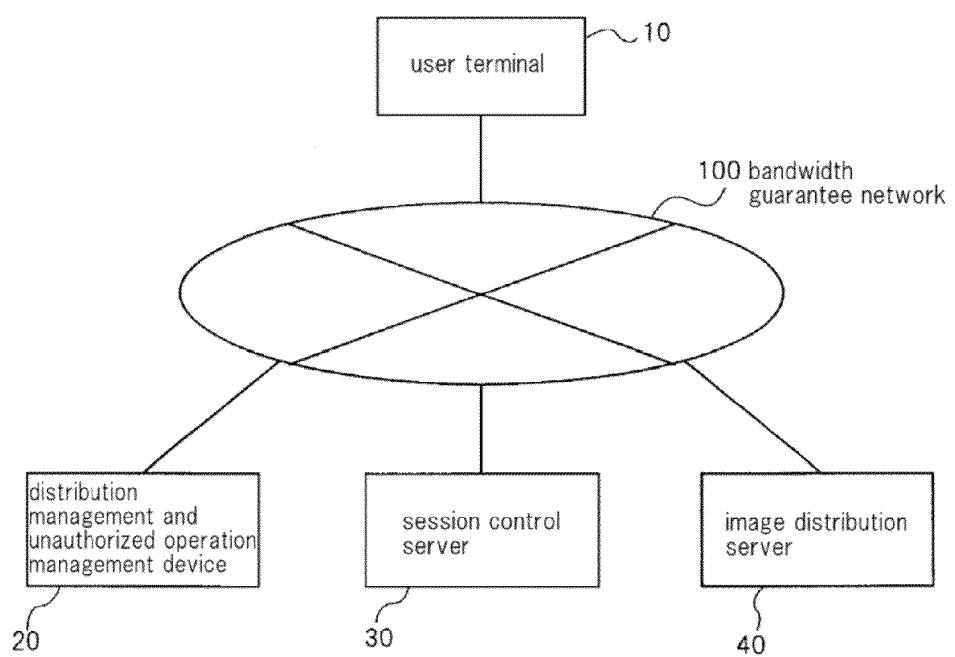
FIG. 1 is a conceptual diagram illustrating an exemplary embodiment of a content distribution system of the invention.
Figure 2:
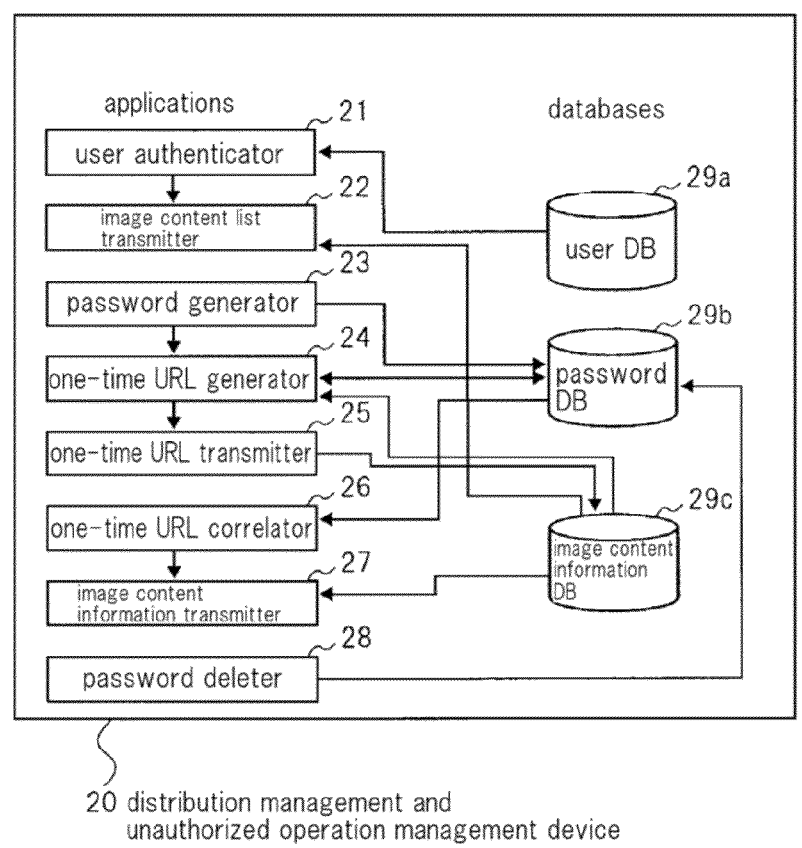
FIG. 2 is a diagram illustrating the construction of a distribution management and unauthorized operation management device shown in FIG. 1.
Figure 3:
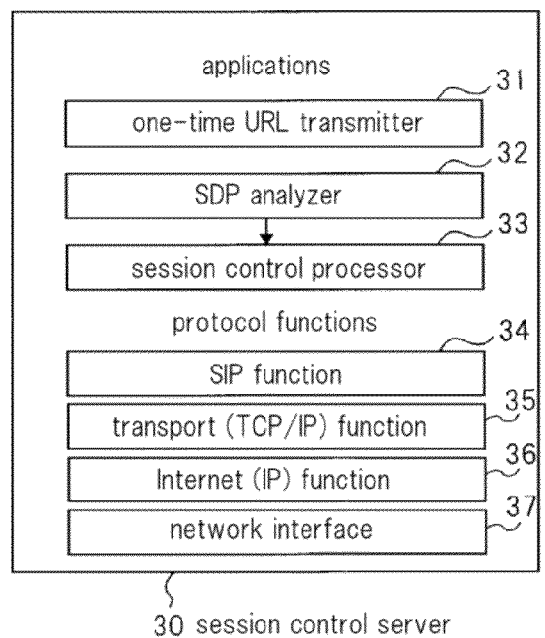
FIG. 3 is a diagram illustrating the construction of a session control server shown in FIG. 1.
Figure 4:
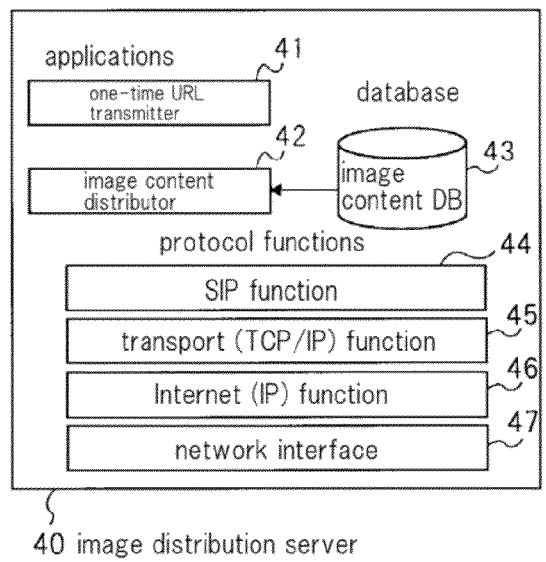
FIG. 4 is a diagram illustrating the construction of an image distribution server shown in FIG. 1.

FIG. 1 is a conceptual diagram illustrating an exemplary embodiment of a content distribution system of the invention, FIG. 2 is a diagram illustrating the construction of distribution management and unauthorized operation management device 20 shown in FIG. 1, FIG. 3 is a diagram illustrating construction of session control server 30 shown in FIG. 1, and FIG. 4 is a diagram illustrating construction of image distribution server 40 shown in FIG. 1.

The content distribution system of this embodiment is for distributing image content to user terminal 10 in bandwidth guarantee network 100, and includes distribution management and unauthorized operation management device 20, session control server 30 and image distribution server 40, each of which is connected to bandwidth guarantee network 100.

Distribution management and unauthorized operation management device 20 generates a one-time URL using an URL of content information specified by user terminal 10, and transmits the generated one-time URL together with bandwidth information concerning the content information to user terminal 10. As shown in FIG. 2, distribution management and unauthorized operation management device 20 includes, as applications, user authenticator 21, image content list transmitter 22, password generator 23, one-time URL generator 24, one-time URL transmitter 25, one-time URL correlator 26, image content information transmitter 27 and password deleter 28. Distribution management and unauthorized operation management device 20 also includes, as databases, user database 29a, password database 29b and image content information database 29c.

When accessed using user identification information, such as a user ID and a password, sent from user terminal 10, user authenticator 21 authenticates user terminal 10 by confirming whether or not the user ID and the password are previously registered in user database 29a.

Content list transmitter 22 transmits list information for specifying image content distributed from image distribution server 40 only if the user ID and the password are previously registered in user database 29a.

Password generator 23 generates a password for identifying user terminal 10 in response to an image content distribution request sent from user terminal 10.

One-time URL generator 24 generates the one-time URL using the URL of the image content specified by user terminal 10, and stores the generated one-time URL in password database 29b.

One-time URL generator 25 transmits the one-time URL generated by one-time URL generator 24 together with confirmation information concerning the image content including the bandwidth information concerning the image content, a media type of the image content, or transport information used for transmission of media to user terminal 10.

One-time URL correlator 26 authenticates user terminal 10 by correlating the one-time URL sent from session control server 30 with the one-time URL stored in password database 29b.

When user terminal 10 is authenticated by one-time URL correlator 26, image content information transmitter 27 transmits an authentication result together with identification information concerning the image content to session control server 30.

Password deleter 28 deletes the one-time URL stored in password database 29b when notified from image distribution server 40 that the image content is distributed to a user terminal.

In addition, session control sever 30 extracts a one-time URL from a session control message sent from user terminal 10, and transmits the extracted one-time URL to distribution management and unauthorized operation management device 20. Session control server 30 also establishes a session between image distribution server 40 and user terminal 10 according to an authentication result performed by using the one-time URL sent from distribution management and unauthorized operation management device 20 and a correlation result obtained by correlating identification information of the image content contained in the session control message sent from user terminal 10 with identification information concerning the image content sent together with the authentication result from distribution management and unauthorized operation management device 20. As shown in FIG. 3, session control server 30 includes, as applications, one-time URL transmitter 31, SDP analyzer 32 and session control processor 33, and as protocol functions, SIP function 34, transport (TCP/IP) function 35, Internet (IP) function 36 and network interface 37.

One-time URL transmitter 31 extracts the one-time URL from the session control message sent from user terminal 10, and transmits the extracted one-time URL to distribution management and unauthorized operation management device 20.

SDP analyzer 32 correlates identification information concerning the image content contained in the session control message sent from user terminal 10 with the identification information concerning the image content sent together with the authentication result from distribution management and unauthorized operation management device 20.

Session control processor 33 establishes the session between content distribution server 40 and user terminal 10 according to the authentication result sent from distribution management and unauthorized operation management device 20 and the correlation result of the identification information concerning the image content obtained by SDP analyzer 32.

In addition, image distribution server 40 is for distributing image content to user terminal 10. As shown in FIG. 4, image distribution server 40 includes, as applications, one-time URL transmitter 41 and image content distributor 42, and, as a database, image content database 43. Image distribution server 40 also includes, as protocol functions, SIP function 44, transport (TCP/IP) function 45, Internet (IP) function 46 and network interface 47.

One-time URL transmitter 41 extracts the one-time URL from the session control message sent from session control server 30, and transmits the extracted one-time URL to distribution management and unauthorized operation management device 20.

Image content distributor 42 distributes image content stored in image content database 43 to user terminal 10.

Below, a description will be given of a content distribution method in the content distribution system constructed as above. The content distribution method of this embodiment is for preventing an unauthorized operation, in which user terminal 10 requests more bandwidths than it needs by using SIP (Session Initiation Protocol) as session control.

Figure 5:
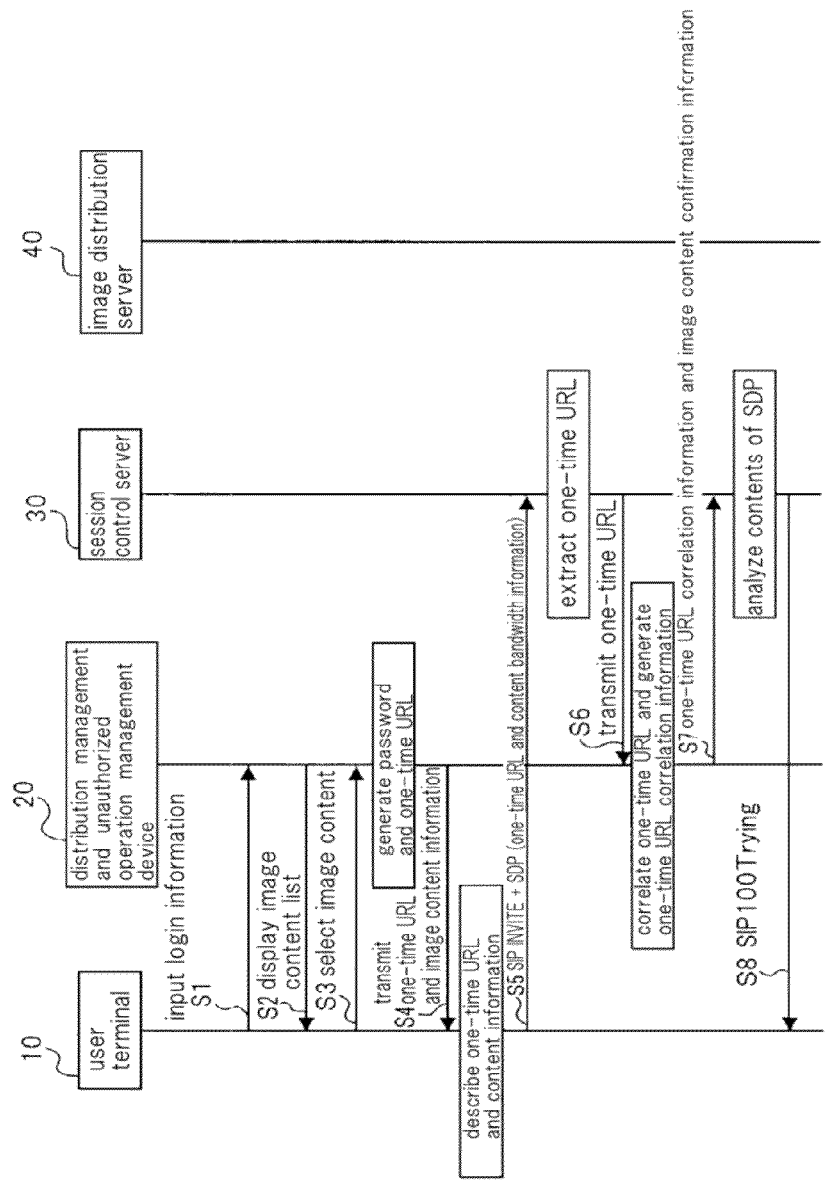
FIG. 5 is a timing chart for explaining a content distribution method in the content distribution system shown in FIGS. 1 to 4.

FIGS. 5 and 6 are timing charts for explaining the content distribution method in the content distribution system shown in FIGS. 1 to 4.

First, in step S1, user terminal 10 accesses distribution management and unauthorized operation management device 20, a user ID and a password are transmitted from user terminal 10, and user authentication is carried out by user authenticator 21 of distribution management and unauthorized operation management device 20, determining by searching whether or not the user ID and the password sent from user terminal 10 are stored in user database 29a. If the user ID and the password sent from user terminal 10 are stored in user database 29a, user terminal 10 is determined as a regular user terminal, image content list transmitter 22 describes an image content list by referring to image content information database 29c, and in step S2, the image content list is transmitted to user terminal 10. On the other hand, if the user ID and the password sent from user terminal 10 are not stored in user database 29a, an error message rather than the image content list is transmitted to user terminal 10.

User terminal 10, when authenticated as a regular user in the user authentication, selects image content from image content list information sent from distribution management and unauthorized operation management device 20 in step S3. When an image content distribution request is transmitted to distribution management and unauthorized operation management device 20, firstly, password generator 23 of distribution management and unauthorized operation management device 20 receives the image content distribution request sent from user terminal 10 and describes a password that is used to identify user terminal 10. In addition, one-time URL generator 24 searches image content database 29c for an actual URL of the selected image content. The password generated by password generator 23 and the actual URL of the image content searched from image content database 29c are combined with each other, thereby forming a one-time URL, which is in turn stored in password database 29b. Image content identification information including bandwidth information and media type of image content and transport information used for transmission of media is searched from image content database 29c, and in step S4, the generated one-time URL and the image content identification information are transmitted from one-time URL transmitter 25 to user terminal 10.

Then, user terminal 10 describes the image content identification information and the one-time URL for identifying image content, sent from distribution management and unauthorized operation management device 20, in a SDP (Session Description Protocol) in a SIP INVITE message acting as a session control message, and in step S5, the SIP INVITE message is transmitted to session control server 30.

Then, one-time URL transmitter 31 of session control server 30 extracts the one-time URL described in the SIP INVITE message sent from user terminal 10, and in step S6, the extracted one-time URL is transmitted to distribution management and unauthorized operation management device 20.

In distribution management and unauthorized operation management device 20, firstly, one-time URL correlator 26 correlates the one-time URL sent from session control server 30 to the one-time URL stored in password database 29b. This procedure confirms access by a regular user terminal and a regular image content distribution request. In the case where the one-time URL sent from session control server 30 is stored in password database 29b, a piece of information notifying that user terminal 10 is authenticated is described. The described piece of information is transmitted from distribution management and unauthorized operation management device 20 to session control server 30, and at the same time, in step S7, the identifying information including bandwidth information concerning image content corresponding to the one-time URL is transmitted from image content information transmitter 27 to session control server 30. If the one-time URL sent from session control server 30 is not stored in password database 29b, a piece of information notifying that one-time URL correlation was not performed is generated and is then transmitted to session control server 30.

When an authentication result and image content identification information are transmitted from distribution management and unauthorized operation management device 20, session control server 30 determines that a SIP INVITE message and a proper URL of image content sent from regular user terminal 10 are to referred to. Session control server 30 analyzes whether or not the SDP of the SIP INVITE message sent from user terminal 10 continues to cause an unauthorized operation. SDP analyzer 32 of session control server 30 correlates the bandwidth information concerning the image content contained in the SDP, which was transmitted from user terminal 10 in step S5, with the bandwidth information concerning the image content, which was transmitted together with the authentication result obtained using the one-time URL sent from distribution management and unauthorized operation management device 20 in step S7. This as a result confirms whether or not the SDP, sent from user terminal 10 in step S5, contains unauthorized bandwidth information. Only if the SDP does not contain unauthorized bandwidth information, a session establishment request from user terminal 10 is accepted, and in step S8, a SIP 100 Trying message is transmitted from session control processor 33 to user terminal 10. On the other hand, if the SDP contains unauthorized bandwidth information, a next session request from a user terminal is not accepted. In addition, if only the authentication result using the one-time URL is transmitted from distribution management and unauthorized operation management device 20, the SIP INVITE message and the URL of unauthorized image content sent from unauthorized user terminal 10 are determined as have been referred to, and a next session request from the user terminal is not accepted.

In addition, in step S9, a SIP INVITE message is transmitted from session control server 30 to image distribution server 40.

Then, one-time URL transmitter 41 of image distribution server 40 extracts the one-time URL from the SIP INVITE message sent from session control server 30. In step S10, one-time URL transmitter 41 of image distribution server 40 transmits the extracted URL to distribution management and unauthorized operation management device 20.

Image content information transmitter 27 of distribution management and unauthorized operation management device 20 searches image content information database 29c for corresponding image content information shows image content corresponding to the one-time URL, sent from image distribution server 40. In step S11, image content information transmitter 27 of distribution management and unauthorized operation management device 20 transmits the searched corresponding image content information to image distribution server 40.

Image content distributor 42 of image distribution server 40 confirms whether or not the image content identified by the corresponding image content information sent from distribution management and unauthorized operation management device 20 is stored in image content database 43. If the image content is stored in image content database 43, a SIP 100 Trying message is transmitted to session control server 30 in step S12. In addition, in step S13, image distribution server 40 transmits a SIP 200 OK message to session control server 30 in order to guarantee a bandwidth for the image content.

Then, in step S14, a SIP 200 OK message is transmitted from session control processor 33 of session control server 30 to user terminal 10.

Then, in step S15, user terminal 10 transmits an image content distribution request to image distribution server 40. Next, in step S16, image distribution server 40 distributes the requested image content to user terminal 10.

After the image content is distributed to user terminal 10, a complete notification message is transmitted from image distribution server 40 to distribution management and unauthorized operation management device 20. When the complete notification message is transmitted from image distribution server 40, distribution management and unauthorized operation management device 20 confirms that the image content is distributed to a regular user terminal, and password deleter 28 deletes the one-time URL stored in password database 29b.

While this embodiment has been described with reference to the content distribution system for distributing image content, the invention can also be applied to those systems for distributing voice content.

In addition, in the invention, while the foregoing process in the content distribution system was described, as realized by dedicated hardware, as described above, it can also be provided as a program. Specifically, a program for realizing the corresponding functions can be written in a computer-readable record medium such that a computer accessing distribution management and unauthorized operation management device 20 and session control server 30 can read and execute the program. Examples of the computer-reading record medium include a movable record medium, such as a floppy disc, a magneto-optical disc, a DVD and a CD, and a HDD installed inside the computer. The program written in the record medium can be loaded by, for example, a control block to execute the foregoing process under the control of the control block.

While the present invention has been described with reference to certain exemplary embodiments thereof, it is not intended to be limiting. Rather, it will be understood by those skilled in the art that various changes in form and details may be made therein without departing from the spirit and scope of the present invention as defined by the appended claims and their equivalents.

The invention claimed is:

1. A content distribution system for distributing content from a content distribution server to a user terminal by establishing a session by a session control server in a bandwidth guarantee network, comprising:

a distribution management and unauthorized operation management hardware unit generating a one-time URL by using a URL of content information specified by a user terminal and transmitting the one-time URL and bandwidth information concerning the content information to the user terminal; and the session control server extracting the one-time URL from a session control message transmitted from the user terminal, transmitting the one-time URL to the distribution management and unauthorized operation management hardware unit, and establishing a session between the content distribution server and the user terminal according to an authentication result performed by using the one-time URL transmitted from the distribution management and unauthorized operation management hardware unit and a correlation result obtained by correlating the bandwidth information contained in the session control message transmitted from the user terminal with the bandwidth information transmitted together with the authentication result from the distribution management and unauthorized operation management hardware unit, wherein the distribution management and unauthorized operation management hardware unit includes:

a one-time URL generator generating the one-time URL using the URL of the content information specified by the user terminal;

a first one-time URL transmitter transmitting the one-time URL generated by the one-time URL generator together with the bandwidth information concerning the content information to the user terminal;

a one-time URL correlator authenticating the user terminal using the one-time URL transmitted from the session control server; and an image content information transmitter transmitting the authentication result and the bandwidth information concerning the content information when the user terminal is authenticated the by one-time URL coordinator;

the session control server includes:

a second one-time URL transmitter extracting the one-time URL from the session control message transmitted from the user terminal and transmitting the extracted one-time URL to the distribution management and unauthorized operation management hardware unit;

a SDP analyzer correlating the bandwidth information contained in the session control message transmitted from the user terminal with the bandwidth information transmitted together with the authentication result from the distribution management and unauthorized operation management hardware unit; and a session control processor establishing the session between the content distribution server and the user terminal according to the authentication result transmitted from the distribution management and unauthorized operation management hardware unit and a correlation result of the bandwidth information obtained by the SDP analyzer, and wherein the distribution management and unauthorized operation management hardware unit includes:

a user authenticator authenticating the user terminal by confirming whether or not user identification information is previously registered in a database when accessed using the user identification information transmitted from the user terminal; and a content list transmitter transmitting a list of content information, stored in the database of the content distribution server, to the user terminal only when the user identification information is previously stored in the database.

2. A content distribution method for performing, at a distribution management and unauthorized operation management hardware unit, distribution management when distributing content from a content distribution server to a user terminal by establishing a session by a session control server in a bandwidth guarantee network, comprising:

generating, at the distribution management and unauthorized operation management hardware unit, a one-time URL by using a URL of content information specified by a user terminal;

transmitting, at the distribution management and unauthorized operation management hardware unit, the generated one-time URL and bandwidth information concerning the content information to the user terminal;

extracting, at the session control server, the one-time URL from a session control message transmitted from the user terminal and transmitting the one-time URL to the distribution management and unauthorized operation management hardware unit;

authenticating, at the distribution management and unauthorized operation management hardware unit, the user terminal using the one-time URL transmitted from the session control server and transmitting an authentication result obtained by authenticating the user terminal to the session control server;

correlating, at the session control server, the bandwidth information contained in the session control message transmitted from the user terminal with the bandwidth information transmitted together with the authentication result from the distribution management and unauthorized operation management hardware unit; and establishing, at the session control server, a session between the content distribution server and the user terminal according to the authentication result transmitted from the distribution management and unauthorized operation management hardware unit and a correlation result of the bandwidth information, wherein the distribution management and unauthorized operation management hardware unit, when accessed using user identification information transmitted from the user terminal, transmits a list of content information, registered in a database of the content distribution server, to the user terminal only when the user identification information is previously registered in the database.

3. A non-transitory computer-readable data storage medium storing a computer program that when executed by a computer causes the computer to perform a method to realize a content distribution system and to perform distribution management by a distribution management and unauthorized operation management unit when distributing content from a content distribution server to a user terminal by establishing a session by a session control server in a bandwidth guarantee network, the method comprising:

generating, at the distribution management and unauthorized operation management unit, a one-time URL by using a URL of content information specified by a user terminal and transmitting the one-time URL and bandwidth information concerning the content information to the user terminal; and extracting, at the session control server, the one-time URL from a session control message transmitted from the user terminal, transmitting the one-time URL to the distribution management and unauthorized operation management unit, and establishing a session between the content distribution server and the user terminal according to an authentication result performed by using the one-time URL transmitted from the distribution management and unauthorized operation management unit and a correlation result obtained by correlating the bandwidth information contained in the session control message transmitted from the user terminal with the bandwidth information transmitted together with the authentication result from the distribution management and unauthorized operation management unit, wherein the distribution management and unauthorized operation management unit, when accessed using user identification information transmitted from the user terminal, transmits a list of content information, stored in a database of the content distribution server, to the user terminal only when the user identification information is previously registered in the database.

* * * * *